United States Patent
Lang et al.

(10) Patent No.: US 10,459,739 B2
(45) Date of Patent: Oct. 29, 2019

(54) SYSTEMS AND METHODS FOR CONFIGURING AND PROFILING A DIGITAL MEDIA DEVICE

(75) Inventors: Jonathan Lang, Santa Barbara, CA (US); Chris Fowler, Santa Barbara, CA (US)

(73) Assignee: Sonos Inc., Santa Barbara, CA (US)

( * ) Notice: Subject to any disclaimer, the term of this patent is extended or adjusted under 35 U.S.C. 154(b) by 695 days.

(21) Appl. No.: 12/217,948

(22) Filed: Jul. 9, 2008

(65) Prior Publication Data

US 2010/0010852 A1    Jan. 14, 2010

(51) Int. Cl.
*G06F 9/445* (2018.01)
*G06Q 30/02* (2012.01)
*G06Q 30/06* (2012.01)

(52) U.S. Cl.
CPC ..... *G06F 9/44505* (2013.01); *G06Q 30/0201* (2013.01); *G06Q 30/0641* (2013.01)

(58) Field of Classification Search
CPC . G06F 21/10; G06F 9/44505; G06Q 30/0201; G06Q 30/0641
USPC ........................................................ 705/59
See application file for complete search history.

(56) References Cited

U.S. PATENT DOCUMENTS

| | | | |
|---|---|---|---|
| 5,440,644 A | 8/1995 | Farinelli et al. | |
| 5,646,602 A * | 7/1997 | Gertz | G08B 13/1409 340/2.1 |
| 5,761,320 A | 6/1998 | Farinelli et al. | |
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,640,284 B1 * | 10/2003 | Shaw et al. | 711/129 |
| 6,728,531 B1 * | 4/2004 | Lee et al. | 455/419 |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,174,312 B2 * | 2/2007 | Harper et al. | 705/35 |
| 7,236,773 B2 | 6/2007 | Thomas | |
| 7,295,548 B2 | 11/2007 | Blank et al. | |
| 7,391,791 B2 | 6/2008 | Balassanian et al. | |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

White, Ron. "How Computerts Work." Millenium Edition, Que Corporation, 1999.*

(Continued)

*Primary Examiner* — John Van Bramer
*Assistant Examiner* — Monica A Mandel (57) ABSTRACT

A system, method, and computer program for configuring and profiling digital media devices is provided. The digital media device is monitored for user interaction. Profile data is generated based on the user interaction. The digital media device is automatically configured based on the profile data.

20 Claims, 4 Drawing Sheets

(56) References Cited

U.S. PATENT DOCUMENTS

| | | | |
|---|---|---|---|
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington et al. | |
| 8,243,141 B2 | 8/2012 | Greenberger et al. | |
| 8,483,853 B1 | 7/2013 | Lambourne | |
| 8,886,933 B1 | 11/2014 | Poiesz et al. | |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2002/0142815 A1* | 10/2002 | Candelore | 463/1 |
| 2003/0157951 A1 | 8/2003 | Hasty | |
| 2004/0024478 A1 | 2/2004 | Hans et al. | |
| 2004/0181818 A1* | 9/2004 | Heyner et al. | 725/146 |
| 2005/0216855 A1* | 9/2005 | Kopra | G06F 17/3002 715/767 |
| 2006/0026210 A1* | 2/2006 | Vaszary | G06F 17/30707 |
| 2006/0173985 A1* | 8/2006 | Moore | 709/223 |
| 2007/0142944 A1 | 6/2007 | Goldberg et al. | |
| 2007/0299681 A1* | 12/2007 | Plastina et al. | 705/1 |
| 2008/0004748 A1* | 1/2008 | Butler | G06Q 30/02 700/244 |
| 2009/0094540 A1* | 4/2009 | Gray et al. | 715/764 |

OTHER PUBLICATIONS

Tweeter Teams with Sonos to Bring the Whole-Home Audio and Digital Experience to Life on the Retail Floor. Press Release [online ]2006[retrieved Aug. 22, 2019].Retrieved from: <URL:https://web.archive.org/web/20080312090556/http://www.sonos.com/news_and_reviews/press_releases/2006/pr_111506_tweeter.htm> (Year: 2007).*

"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
"Denon 2003-2004 Product Catalog," Denon, 2003-2004, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

SYSTEMS AND METHODS FOR CONFIGURING AND PROFILING A DIGITAL MEDIA DEVICE

BACKGROUND

Field of the Invention

The present invention relates generally to media services, and more particularly to systems and methods for configuring and profiling a digital media device.

Background Art

Conventionally, retail environments offer various products to customers. For example, digital devices can often be purchased in retail environments, such as electronic equipment stores. Because customers often want to view demonstrations of the products before purchase, the retail environments that offer the products typically maintain applications on the products that allow the products to demonstrate music, movies, and so forth.

Product demonstrations using applications are frequently generic. For example, songs may be demonstrated using the devices that may not appeal to an intended audience for the particular retail environment. Further, Internet-enabled products sometimes require the entry of account information to access services provided via the Internet.

SUMMARY OF THE INVENTION

A system, method, and computer program for configuring and profiling a digital media device is provided. The digital media device is monitored for user interaction. Profile data is generated based on the user interaction. The digital media device is automatically configured based on the profile data.

DESCRIPTION OF EXEMPLARY EMBODIMENTS

Figure 1:
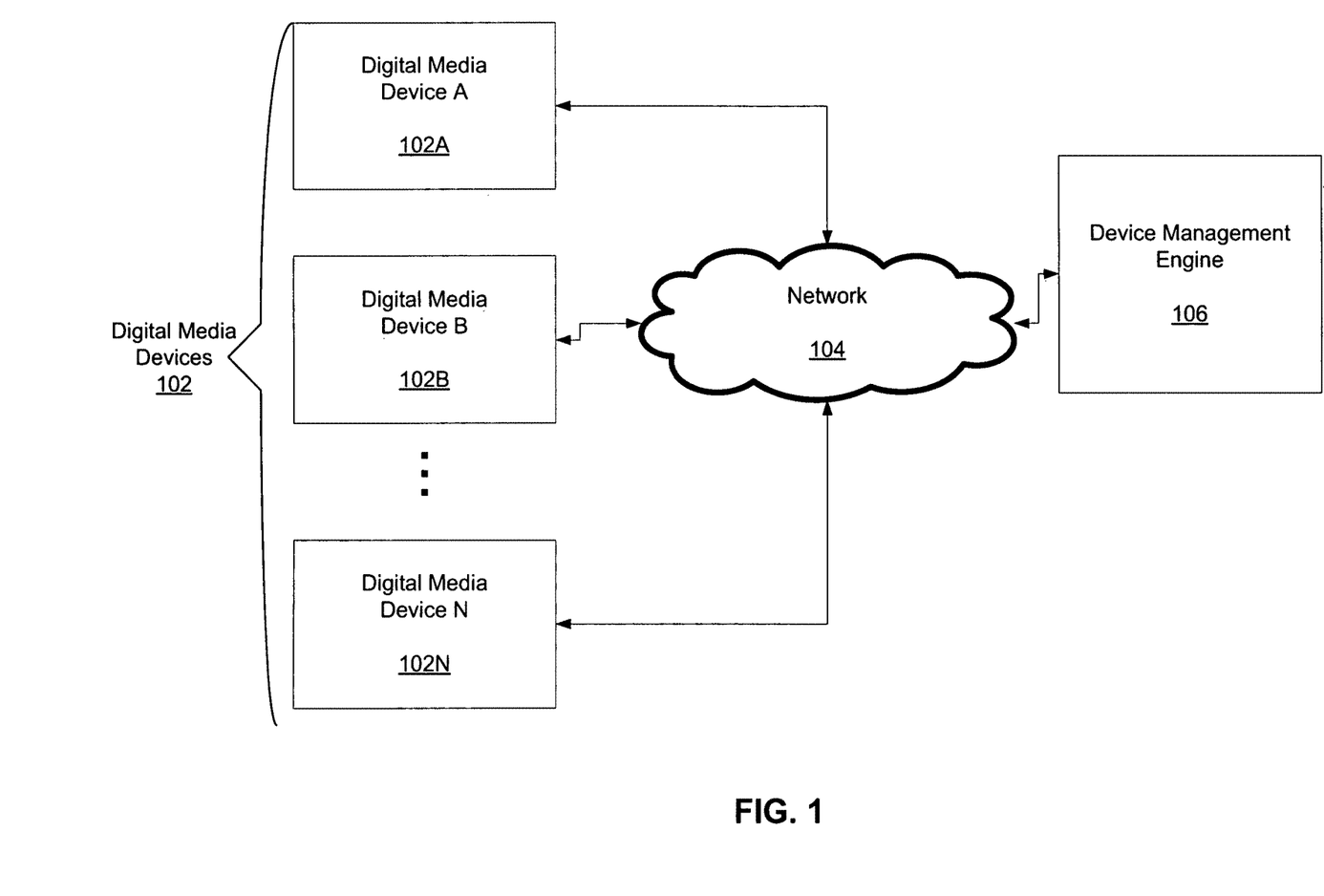
FIG. 1 is a block diagram of an exemplary environment for configuring and profiling digital media devices.

Referring now to FIG. 1, a block diagram of an exemplary environment for configuring and profiling digital media devices, such as digital media devices in a retail environment, is shown. A digital music system comprising a wireless, multi-room digital music system that lets you play digital music all over your house, business, or any other location may be provided. The digital media system may be controlled via a single digital media device. The digital media device may be sold in a retail environment. The digital media device may be configured according to various parameters and/or monitored in order to generate profile data, for re-configuration, and so forth.

One or more digital media devices 102, such as a digital media device A 102A, a digital media device B 102B, and a digital media device N 102N, are in communication via a network 104 with a device management engine 106. The digital media devices 102 may be associated with a retail environment, such as a retail brick and mortar store, an online retailer, and so forth. The device management engine 106 may be associated with a manufacturer, distributor, and/or service provider for the digital media devices 102. Although digital media devices 102 are discussed herein, any type of digital device may be managed, configured, and/or profiled according to some embodiments.

The digital media devices 102 can access the device management engine 106 via the network 104, directly, or via a computing device, such as a laptop or desktop computer, a cellular telephone, a personal digital assistant (PDA), a set top box, and so forth. According to exemplary embodiments, the device management engine 106 sends configuration data and monitors the digital media devices 102 via the network 104. In one embodiment, the digital media devices 102 may connect to the device management engine 106 periodically via the network 104 to be monitored. Alternatively, the digital media devices 102 may connect when an event occurs, such as when a user activates an application on the digital media device 102 or attempts to log into a subscription service. The digital media device 102 may initiate communication with the device management engine 106 according to some embodiments. The device management engine 106 may connect to one of the digital media devices 102, which then monitors the other digital media devices 102 through a local network, according to some embodiments. The digital media devices 102 may be located within a retail environment or any other environment.

The digital media devices 102 may be provided with configuration data for various purposes, such as for determining settings associated with the digital media devices 102, demonstrations, re-configuration based on profile data, and so forth. Some of the digital media devices 102 may be demonstration units and/or have modes of operation that include a demonstration mode according to some embodiments.

Figure 2:
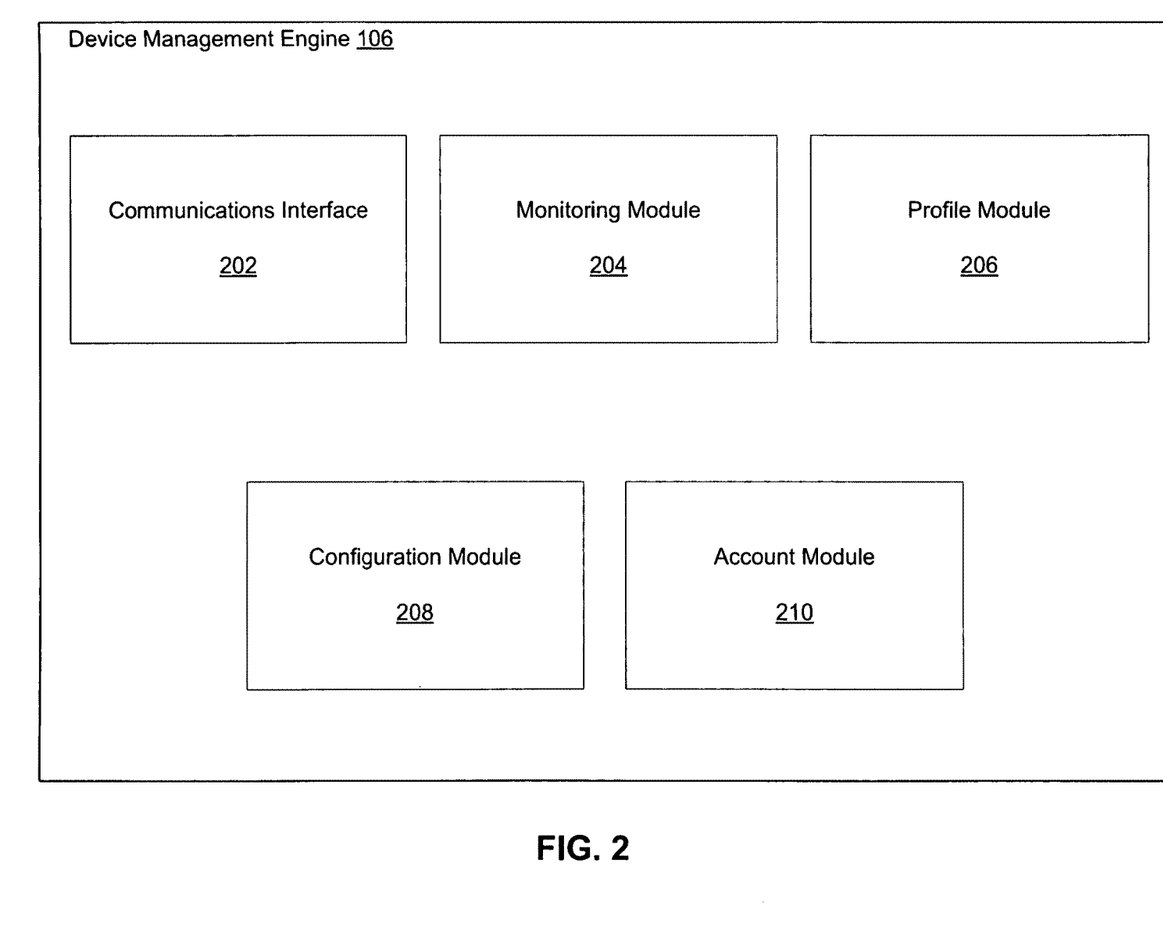
FIG. 2 is a block diagram of an exemplary device management engine.

FIG. 2 is a block diagram of an exemplary device management engine, such as the device management engine 106 shown in FIG. 1. The device management engine 106 may comprise a communications interface 202, a monitoring module 204, a profile module 206, a configuration module 208, and an account module 210. Although FIG. 2 describes the device management engine 106 as including various modules, fewer or more modules may comprise the device management engine 106 and/or any of the various modules comprising the device management engine 106 and still fall within the scope of various embodiments.

The communications interface 202 may facilitate communication between the device management engine 106 and the digital media devices 102. For example, the communications interface 202 may communicate configuration data, profile data, messages, such as emails, text messages, error messages, operational detail messages, software updates, and so forth to the digital media devices 102 or to any other device or person.

A monitoring module 204 may monitor the one or more digital media devices 102 within the retail environment, as discussed herein. The retail environment may include one or more retail stores. For example, a retail store may sell various digital media devices, such as digital music devices, digital video devices, digital picture devices, and so forth. Various digital media devices 102 in hundreds of stores may be monitored. The monitoring module 204 may schedule times for the device management engine 106 to connect to these digital media devices 102 via the network 104.

The monitoring module 204 may then track user interaction with the digital media devices 102, demonstrations being played by the digital media devices 102, input from sales people associated with the digital media devices 102, software application versions running on the digital media devices 102, functioning of the digital media devices 102, whether the digital media devices 102 are on or off, and so forth. Based on the monitoring, the monitoring module 204 may forward data obtained to one or more other modules associated with the device management engine 106.

According to some embodiments, digital media devices 102 may identify themselves as retail units. The retail units may check in with the device management engine 106 to be monitored more frequently than other digital media devices 102, for example. The retail units may be provided with different data from other digital media devices 102 or otherwise be treated differently. For example, the user interaction with the retail units may be monitored more closely in order to generate detailed profile data associated with each of the retail units.

Monitoring the digital media devices 102 may be utilized to identify various uses of the digital media devices 102. For example, a profile for each of the digital media devices 102 may be generated by the digital media devices 102 or obtained from a third party. The profile may be based on user interaction with the digital media devices 102, as discussed herein. For example, the media user's access, the demonstration request, and so forth may be utilized to generate the profile. The profile may be created for each digital media device 102 at a single retail location or for the various digital media devices 102 at a single retail location. In other words, each of the digital media devices 102 may be associated with a separate profile or all of the digital media devices may be associated with a single profile.

A profile may also be generated for the digital media devices 102 associated with various retail locations that are grouped together. For example, the digital media devices 102 associated with retail locations within a region, county, state, section of country, and so forth may be grouped together. The groups may be predetermined by the device management engine 106 or the groups may be selected or determined based on the profile data from the digital media devices 102. Any types of groups may be provided according to any number of parameters, such as geographical parameters, demographic parameters, and so forth. Users of the digital media devices 102 may optionally provide profile data about themselves, such as demographic data. The retail locations may also provide demographic data about customers. Demographic data associated with likely customers within a geographical area may be accessed from any source and utilized to generate profiles. Any source of profile data may be utilized.

The profiles generated by the profile module 206 may be forwarded to a configuration module 208. The configuration module 208 may send configuration data to the digital media devices 102. The configuration data may be the same or similar for each of the digital media devices 102 or the configuration data may be based on the profiles generated. According to some embodiments, the configuration data may be based on needs of a particular retail location(s) and re-configuration data may be sent to the digital media devices 102 when updated profiles are generated from the particular retail location(s).

According to various embodiments, the configuration module 208 may be further configured to auto-populate a music library and/or an active music queue. In one exemplary embodiment, the configuration module 208 may automatically adjusts certain music settings, such as bass, treble, balance, loudness, etc. The digital devices 102 may be named automatically by the configuration module, in accordance with some embodiments. Similarly, a "dealer lock" mode and/or sleep-mode may be automatically set by exemplary embodiments of the configuration module 208.

The configuration module 208 may automatically configure the digital media devices 102 based on the profiles, according to some embodiments. The configuration data may be changed based on any other information, such as the retailer, the retail location, updated profile data, and so forth. Any information may be utilized to configure and/or re-configure the digital media devices 102.

An account module 210 may be provided for registering the digital media devices 102 with subscription services. The account module 210 may send subscription data, such as temporary login information, to the digital media devices 102. Alternatively, the account module 210 can auto-populate a subscription registration for the digital media devices 102 or otherwise automatically register the digital media devices 102 for the subscription services. For example, the account module 210 may provide the digital media devices 102 with a username and password for online service accounts, such as for a music download service. According to some embodiments, the account module 210 sends account information to the digital media devices 102 periodically so the digital media devices 102 can maintain current demonstration data. For example, the account module 210 can send subscription data to the digital media devices 102 each month based on popular websites or services for the particular month.

The subscription account data may be sent for subscription accounts that are popular at the particular retail location based on feedback from the digital media devices 102, feedback from personnel at the retail locations, profiles, and so forth. For example, popular websites or services may be determined based on profiles generated for the digital media devices 102 at particular retail locations within a timeframe. The monitoring module 204 may specify timeframes for collecting user interaction data for generating the profiles, such as user interaction data within a week, a month, and so forth. Any timeframe may be specified for collecting user interaction data for generating the profiles. The subscription account data may be customized for each retail location and/or a group of retail locations based on the profiles.

Optionally, each digital media device 102 and/or retail store may be provided with subscription data, such as a trial account, for example. For example, the account module 210 may provide the subscription data. As discussed herein, the trial account may be customized for the digital media devices 102 according to profile data associated with the digital media devices 102, retail store location, or any other information. For example, digital media devices 102 in retail stores in a Midwest region may have trial accounts for country music set up or pre-populated.

Although various modules are shown in FIG. 2 as part of the device management engine 106, fewer or more modules may comprise the device management engine 106 and still fall within the scope of various embodiments. For example, an update module (not shown) may be provided for generating and sending updates to the digital media devices 102. Further, although FIGS. 1 and 2 detail the use of the digital media devices 102 in retail environments, the digital media devices 102 may be remotely managed within residential environments or other commercial environments. For example, the monitoring module 204 may monitor digital media devices 102 in homes of users for providing remote resolutions, such as home-based profiles, error fixes, upgrades, on/off indicators, account updates, and so forth.

In one embodiment, a retail store may register one or more of the digital media devices 102 for management by completing an online registration process with the device management engine 106. The device management engine 106 configures the digital media devices 102 and the digital media devices 102 are monitored and/or check in with the device management engine 106 periodically. Data from the digital media devices 102 may be extracted and forwarded to subscription service providers that may then enable one or more trial accounts based on the data from the digital media devices 102, such as a trial account from a music service provider.

Figure 3:
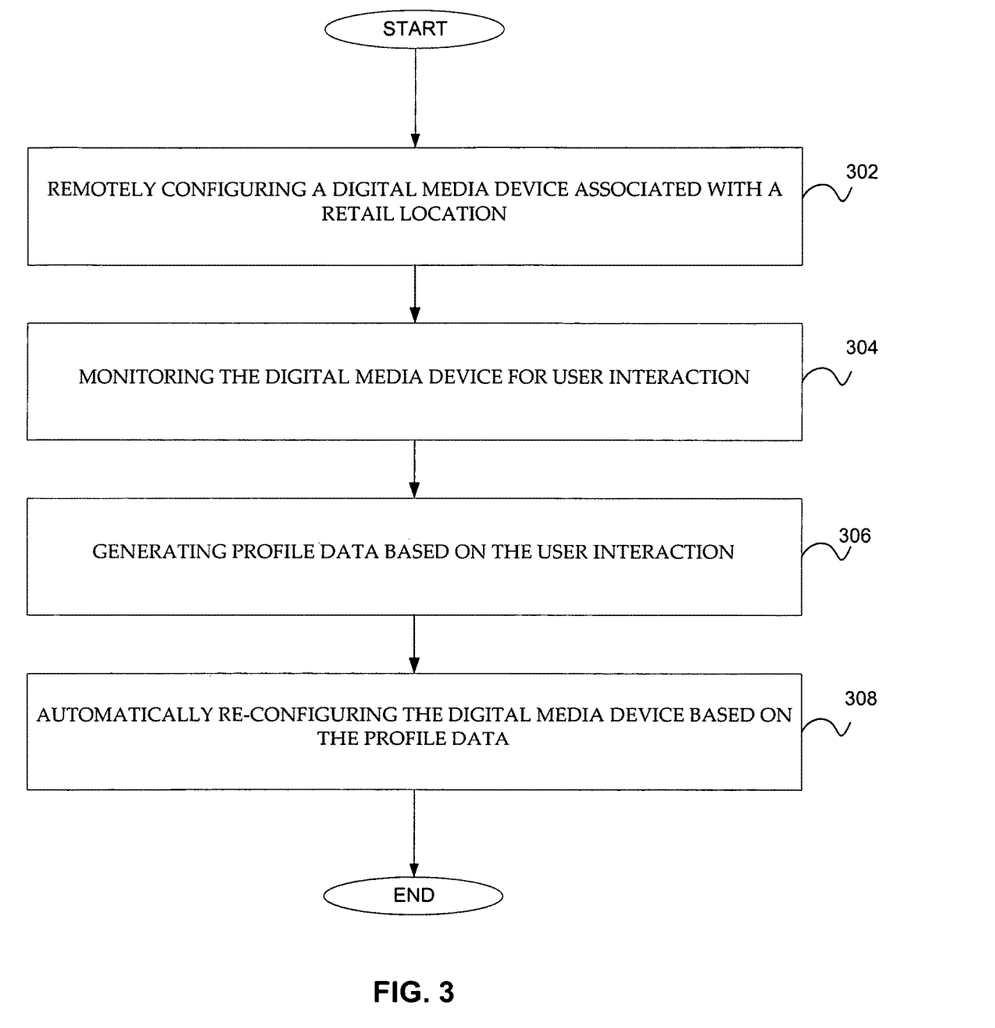
FIG. 3 is a flow diagram of an exemplary process for configuring and profiling a digital media device.

FIG. 3 is a flow diagram of an exemplary process for configuring and profiling a digital media device, such as the digital media devices 102 discussed herein. At step 302, a digital media device 102 associated with a retail is remotely configured. As discussed herein, the configuration module 208 may send configuration data via the network 104 to the digital media devices 102 at retail locations, in home environments, or to any other remote location. The configuration data may include any data for configuring the digital media devices 102, such as settings, subscription data, trial account data, defaults, and so forth.

At step 304, the digital media device is monitored for user interaction. The monitoring module 204 may monitor the digital media devices 102 according to a schedule, based on when the digital media devices check in with the device management engine 106, or according to any other events. The monitoring module 204 collects data about user interaction with the digital media devices 102, about the retailer(s) associated with the digital media devices 102, demographics associated with the users and/or the retail location(s), and so forth.

At step 306, profile data is generated based, in part, on the user interaction. In some embodiments, the profile data may also be generated based, in part, on tags associated with demonstrations led by customers and/or salesmen, for example, to refine sales approaches. The profile data may include the settings the user opted for in association with the digital media device 102, the subscription services the user desired to use, the type of media the user chose to access, and so forth. The profile data may be used in retail location profiling and/or retail location improvement. Any data about the user interaction with the digital media device 102 may be utilized to generate the profile data. Optionally, the user and/or the retailer associated with the digital media device 102 may provide demographic data about the user or a group of users.

At step 308, the digital media device is automatically re-configured based on the profile data. The re-configuration may include any changes to the digital media device 102 based on the profile data, such as changes to settings, subscription services or trial accounts, access to media types, and so forth. According to some embodiments, the retailer may provide profile data associated with the retailer to the device management engine 106, which may be used to re-configure the digital media devices 102. For example, the retailer may use profile data from other retailers and/or retail locations with higher than average sales to re-configure the digital media devices 102. Any user interaction with the digital media devices 102 from any source may be utilized to re-configure the digital media devices 102, as discussed herein.

The device management engine 106 may re-configure groups of digital media devices 102 at a single retail location or across multiple retail locations based on different profile data in order to test the profile data, according to some embodiments. For example, three different groups of digital media devices 102 at one retailer may be re-configured based on three different sets of profile data in order to determine if one of the groups of the digital media devices 102 receives more customer interest or customer sales. The profile data may be utilized for any type of re-configuration for any purpose.

Figure 4:
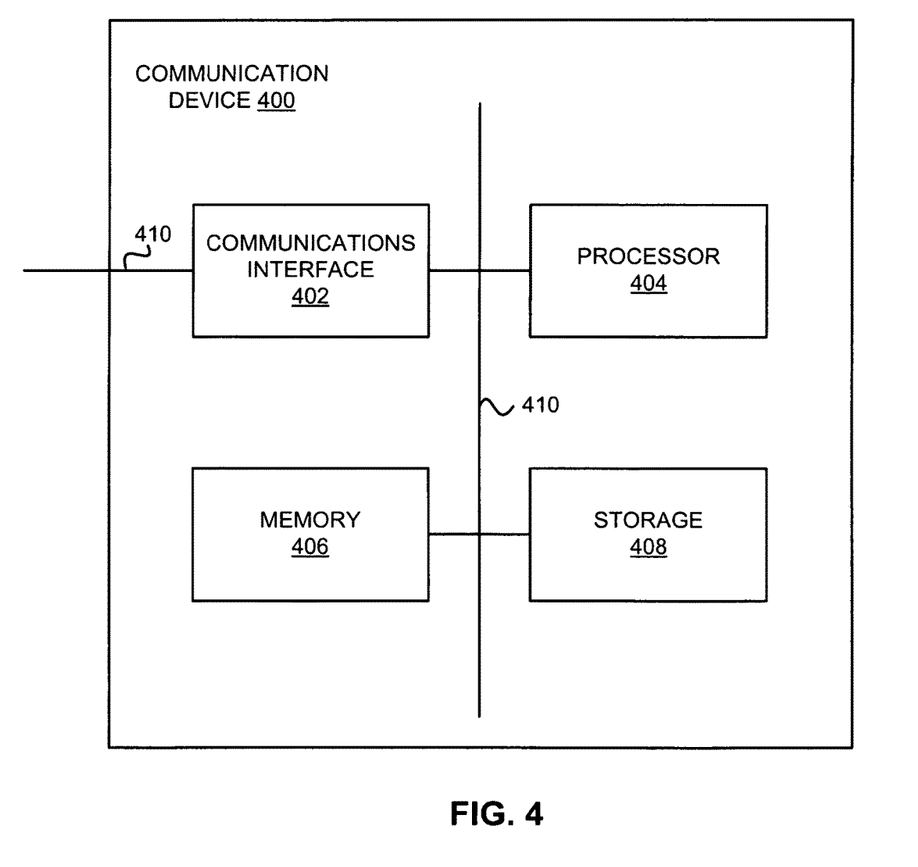
FIG. 4 shows an exemplary communication device.

FIG. 4 shows an exemplary communication device 400. The communication device 400 may comprise the device management engine 106 or the digital media devices 102 according to some embodiments. The communication device 400 comprises at least a communications interface 402, a processor 404, a memory 406, and storage 408, which are all coupled to the bus 410. The bus 410 provides communications between the communications interface 402 the processor 404, the memory 406, and the storage 408.

The processor 404 executes instructions. The memory 406 permanently or temporarily stores data. Some examples of the memory 406 are RAM and ROM. The storage 408 also permanently or temporarily stores data. Some examples of the storage 408 are hard disks and disk drives.

The above-described components and functions can be comprised of instructions that are stored on a computer-readable storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

While various embodiments have been described above, it should be understood that they have been presented by way of example only, and not limitation. For example, any of the elements associated with the device management engine 106 may employ any of the desired functionality set forth hereinabove. Thus, the breadth and scope of a preferred embodiment should not be limited by any of the above-described exemplary embodiments.

What is claimed is:

1. A method, carried out by a communication device, for configuring and profiling a digital media device, the method comprising:

receiving from the digital media device, via a network, an indication of user interaction with the digital media device by a plurality of unidentified users, wherein the digital media device is configured to play music in one or more demonstrations at a retail location and control audible output of the music by one or more other digital media devices comprising audio playback devices wirelessly connected to the digital media device at the retail location, and wherein the digital media device is offered for sale to the plurality of unidentified users;

generating a digital media device profile based, at least in part, on the received indication of the user interaction with the digital media device by the plurality of unidentified users associated with demonstration of music playback via the digital media device, the digital media device profile including information regarding (i) a music download service accessed by the plurality of unidentified users (ii) one or more control settings for controlling the audible output of the music by the one or more other audio playback devices and (iii) one or more music settings set by the plurality of unidentified users for playing the music on the digital media device, the digital media device profile corresponding to a configuration of the digital media device that facilitates use of the digital media device by the plurality of unidentified users;

sending to the digital media device, via the network, configuration data to automatically re-configure the digital media device at the retail location with the configuration that facilitates the use of the digital media device by the plurality of unidentified users, the digital media device being reconfigured based on the configuration data provided from the generated digital media device profile, the automatic reconfiguration of the digital media device triggered in response to the generating of the digital media device profile and not triggered in response to a user request, wherein the reconfiguration changes one or more of the music download service, control settings, and music settings of the digital media device;

re-configuring three different groups of digital media devices at the retail location based on three different sets of profile data;

determining that a given group of the three different groups receives more sales at the retail location; and based on determining that the given group received more sales at the retail location, automatically sending to the digital media device, via the network, other configuration data based on the profile data of the given group, wherein the other configuration data causes the digital media device to change one or more of the music download service, control settings, and music settings of the digital media device such that the digital media device plays back audio based on the other configuration data.

2. The method recited in claim 1, wherein sending to the digital media device, via the network, configuration data to automatically re-configure the digital media device comprises sending the configuration data from a remote location.

3. The method recited in claim 1, wherein automatically re-configuring the digital media device further comprises automatically populating subscription accounts associated with the digital media device.

4. The method recited in claim 1, further comprising generating account information for the retail location associated with the digital media device based on the digital media device profile.

5. The method recited in claim 1, wherein the indication of user interaction is received according to a schedule.

6. The method recited in claim 1, where the digital media device profile is generated further based on demographic information associated with at least one of the plurality of unidentified users and the retail location.

7. The method recited in claim 1, wherein the method comprises configuring and profiling a plurality of digital media devices located at the retail location, the plurality of digital media devices divided into a first group and a second group, the first group to be monitored at a first frequency and be provided with a first data, and the second group to be monitored at a second frequency and be provided with a second data.

8. The method recited in claim 7, wherein at least one of the first group and the second group is to be reconfigured based on the profile.

9. A system for configuring and profiling a digital media device comprising:
a processor; and
a computer-readable medium comprising program instructions that, when executed by the processor, cause a communication device to perform functions comprising:
receiving from the digital media device, via a network, an indication of user interaction with the digital media device by a plurality of unidentified users, wherein the digital media device is configured to play music in one or more demonstrations at a retail location and control audible output of the music by one or more other digital media devices comprising audio playback devices wirelessly connected to the digital media device at the retail location, and wherein the digital media device is offered for sale to the plurality of unidentified users;
generating a digital media device profile based, at least in part, on the received indication of the user interaction with the digital media device by the plurality of unidentified users associated with demonstration of music playback via the digital media device, the digital media device profile including information regarding (i) a music download service accessed by the plurality of unidentified users (ii) one or more control settings for controlling the audible output of the music by the one or more other audio playback devices and (iii) one or more music settings set by the plurality of unidentified users for playing the music on the digital media device, the digital media device profile corresponding to a configuration of the digital media device that facilitates use of the digital media device by the plurality of unidentified users;
sending to the digital media device, via the network, configuration data to automatically re-configure the digital media device at the retail location with the configuration that facilitates the use of the digital media device by the plurality of unidentified users, the digital media device being reconfigured based on the configuration data provided from the generated digital media device profile, the automatic reconfiguration of the digital media device triggered in response to the generating of the digital media device profile and not triggered in response to a user request, wherein the reconfiguration changes one or more of the music download service, control settings, and music settings of the digital media device
re-configuring three different groups of digital media devices at the retail location based on three different sets of profile data;
determining that a given group of the three different groups receives more sales at the retail location; and
based on determining that the given group received more sales at the retail location, automatically sending to the digital media device, via the network, other configuration data based on the profile data of the given group, wherein the other configuration data causes the digital media device to change one or more of the music download service, control settings, and music settings of the digital media device such that the digital media device plays back audio based on the other configuration data.

10. The system recited in claim 9, wherein sending to the digital media device, via the network, configuration data to automatically re-configure the digital media device comprises sending the configuration data from a remote location.

11. The system recited in claim 9, wherein the computer-readable medium further comprises program instructions that, when executed by the processor, cause the communication device to perform functions comprising:

automatically populating accounts associated with the digital media device.

12. The system recited in claim 9, wherein the computer-readable medium further comprises program instructions that, when executed by the processor, cause the communication device to perform functions comprising:
  generating account information for the retail location based on the profile.

13. The system recited in claim 9, wherein the indication of user interaction is received according to a schedule.

14. The system recited in claim 9, where the digital media device profile is generated further based on demographic information associated with at least one of the plurality of unidentified users and the retail location.

15. A non-transitory computer-readable medium having stored thereon instructions for configuring and profiling a digital media device, wherein the instructions, when executed by a processor, cause a communication device to perform functions comprising:
  receiving from the digital media device, via a network, an indication of user interaction with the digital media device by a plurality of unidentified users, wherein the digital media device is configured to play music in one or more demonstrations at the retail location and control audible output of the music by one or more other digital media devices comprising audio playback devices wirelessly connected to the digital media device at the retail location, and wherein the digital media device is offered for sale to the plurality of unidentified users;
  generating a digital media device profile based, at least in part, on the received indication of the user interaction with the digital media device by the plurality of unidentified users associated with demonstration of music playback via the digital media device, the digital media device profile including information regarding (i) a music download service accessed by the plurality of unidentified users (ii) one or more control settings for controlling the audible output of the music by the one or more other audio playback devices and (iii) one or more music settings set by the plurality of unidentified users for playing the music on the digital media device, the digital media device profile corresponding to a configuration of the digital media device that facilitates use of the digital media device by the plurality of unidentified users; and
  sending to the digital media device, via the network, configuration data to automatically re-configure the digital media device at the retail location with the configuration that facilitates the use of the digital media device by the plurality of unidentified users, the digital media device being reconfigured based on the configuration data provided from the generated digital media device profile, the automatic reconfiguration of the digital media device triggered in response to the generating of the digital media device profile and not triggered in response to a user request, wherein the reconfiguration changes one or more of the music download service, control settings, and music settings of the digital media device
  re-configuring three different groups of digital media devices at the retail location based on three different sets of profile data;
  determining that a given group of the three different groups receives more sales at the retail location; and
  based on determining that the given group received more sales at the retail location, automatically sending to the digital media device, via the network, other configuration data based on the profile data of the given group, wherein the other configuration data causes the digital media device to change one or more of the music download service, control settings, and music settings of the digital media device such that the digital media device plays back audio based on the other configuration data.

16. The non-transitory computer-readable medium recited in claim 15, wherein sending to the digital media device, via the network, configuration data to automatically re-configure the digital media device comprises sending the configuration data from a remote location.

17. The non-transitory computer-readable medium recited in claim 15, wherein automatically re-configuring the digital media device further comprises automatically populating subscription accounts associated with the digital media device.

18. The non-transitory computer-readable medium recited in claim 15, further comprising generating account information for the retail location based on the profile.

19. The non-transitory computer-readable medium recited in claim 15, wherein the indication of user interaction is received according to a schedule.

20. The non-transitory computer-readable medium recited in claim 15, where the digital media device profile is generated further based on demographic information associated with at least one of the plurality of unidentified users and the retail location.

* * * * *